(12) United States Patent
Trine et al.

(10) Patent No.: US 6,729,631 B2
(45) Date of Patent: May 4, 2004

(54) MULTI-DIAMETER CONTAINER DOLLY

(75) Inventors: Ralph Trine, Fremont, IN (US); Barry Trine, Fremont, IN (US); Thomas Webster, Angola, IN (US); Andy Link, Hamilton, IN (US)

(73) Assignee: Vestil Manufacturing, Company, Angola, IN (US)

( * ) Notice: Subject to any disclaimer, the term of this patent is extended or adjusted under 35 U.S.C. 154(b) by 0 days.

(21) Appl. No.: 10/054,805

(22) Filed: Jan. 23, 2002

(65) Prior Publication Data

US 2002/0101050 A1 Aug. 1, 2002

Related U.S. Application Data

(60) Provisional application No. 60/263,908, filed on Jan. 24, 2001.

(51) Int. Cl.[7] .................................................. B62B 3/04
(52) U.S. Cl. .................. 280/79.5; 280/47.11; 280/79.6
(58) Field of Search ............................... 280/79.2, 79.5, 280/79.6, 47.11, 30, 47.34; 220/570, 737, 729, 625, 628, 630, 571.1

(56) References Cited

U.S. PATENT DOCUMENTS

| | | | | |
|---|---|---|---|---|
| 2,531,131 A | * | 11/1950 | Johnson ....................... 248/129 |
| 2,573,085 A | * | 10/1951 | Yonkers ..................... 280/79.5 |
| 2,707,351 A | * | 5/1955 | Walker ........................... 47/39 |
| 2,917,769 A | * | 12/1959 | Kasper ......................... 15/323 |
| 3,554,573 A | * | 1/1971 | Miller ....................... 280/79.2 |
| 3,734,527 A | * | 5/1973 | Bard .......................... 280/79.5 |
| 3,802,717 A | * | 4/1974 | Eitreim ..................... 280/79.11 |
| 4,071,163 A | * | 1/1978 | Martin ........................ 220/630 |
| 4,998,696 A | * | 3/1991 | Desjardins .................. 248/146 |
| 5,074,572 A | | 12/1991 | Delmerico et al. |
| 5,110,147 A | | 5/1992 | Gershman |
| 5,445,396 A | * | 8/1995 | Sebor ..................... 280/33.998 |
| 5,472,220 A | | 12/1995 | Stephan |
| 5,474,312 A | * | 12/1995 | Starita et al. ............ 280/47.19 |
| D370,757 S | * | 6/1996 | Loftus et al. ................. D34/23 |
| D395,119 S | * | 6/1998 | Berfield ....................... D34/23 |
| D422,264 S | | 4/2000 | Lux, Jr. |
| RE37,350 E | * | 9/2001 | Stephan ..................... 280/79.5 |
| 6,382,643 B1 | * | 5/2002 | Baker ...................... 280/79.11 |
| 6,419,246 B1 | * | 7/2002 | Neal ......................... 280/79.5 |
| D461,614 S | * | 8/2002 | Liu .............................. D34/23 |
| 6,488,293 B1 | * | 12/2002 | Mitchell et al. ......... 280/47.34 |

FOREIGN PATENT DOCUMENTS

| | | |
|---|---|---|
| DE | 198 480 12 A1 | 4/2000 |
| GB | 2 309 673 | 8/1997 |

* cited by examiner

*Primary Examiner*—Brian L. Johnson
*Assistant Examiner*—Bridget Avery
(74) *Attorney, Agent, or Firm*—Baker & Daniels

(57) ABSTRACT

A multi-diameter container dolly includes an outer ring and a pair of support members, substantially perpendicular to each other that diametrically span the outer ring. The support members are configured to provide a series of nested support surfaces for containers of varying diameters. Each support member has a series of steps yielding support surfaces of progressively smaller diameters relative to the center of the outer ring. Casters are provided at the end of each support member for ease in maneuvering the dolly. A tow strap is also provided for moving the dolly.

14 Claims, 3 Drawing Sheets

MULTI-DIAMETER CONTAINER DOLLY

This application claims the benefit of U.S. Provisional Patent Application Serial No. 60/263,908 filed Jan. 24, 2001, the complete disclosure of which is hereby expressly incorporated by reference.

FIELD OF THE INVENTION

The present invention relates to a dolly for moving containers having a cylindrical base, and more specifically to a dolly having three or more nested support locations of different diameters.

BACKGROUND OF THE INVENTION

Round drum dollies exist for moving individual drums of material. Such dollies typically include a cylindrical outer ring having an inner diameter which is slightly larger than the outer diameter of the container or drum (such as a 55-gallon drum) to be moved using the dolly. The container sits within the outer ring and rests on or is supported by an interior member extending between the outer ring. These conventional dollies are typically equipped with casters or wheels which are mounted below the outer ring to either the support member or the outer ring.

A typical facility or warehouse may have a variety of different cylindrical containers which need to be moved from one location to another. Accordingly, a variety of conventional, single size dollies must be available to accommodate movement of the various sized containers. In most industrial applications, common cylindrical containers include 55-gallon drums, 30-gallon drums, 5-gallon buckets, and standard propane tanks of varying capacity. In order to safely move each of these various sized containers, it is desirable to obtain multiple drum dollies, each having a diameter corresponding to a specific container size. In fact, it may be desirable to obtain multiple dollies of each size to enable movement of more than one container at a time by multiple workers. Obviously, the cost of outfitting a facility with a full complement of ergonomically safe drum dollies increases with the number and size of dolly obtained. Additionally, this quantity of dollies occupies increased storage space when not in use.

SUMMARY OF THE INVENTION

The present invention provides a container dolly adapted to receive any of four standard size cylindrical containers. The dolly includes an outer ring and a pair of support members which extend in substantially perpendicular relationship to one another and span the diameter of the outer ring. The support members include a plurality of downward steps at increasingly smaller diameters relative to the center of the outer ring which together define nested support locations to accommodate containers of various diameters. The dolly further includes four casters which are mounted below the support members adjacent the outer ring.

These and other advantages of the present invention will be more apparent and the invention better understood by reference to the following description in conjunction with the accompanying drawings.

DETAILED DESCRIPTION OF EMBODIMENTS OF THE INVENTION

Figure 1:
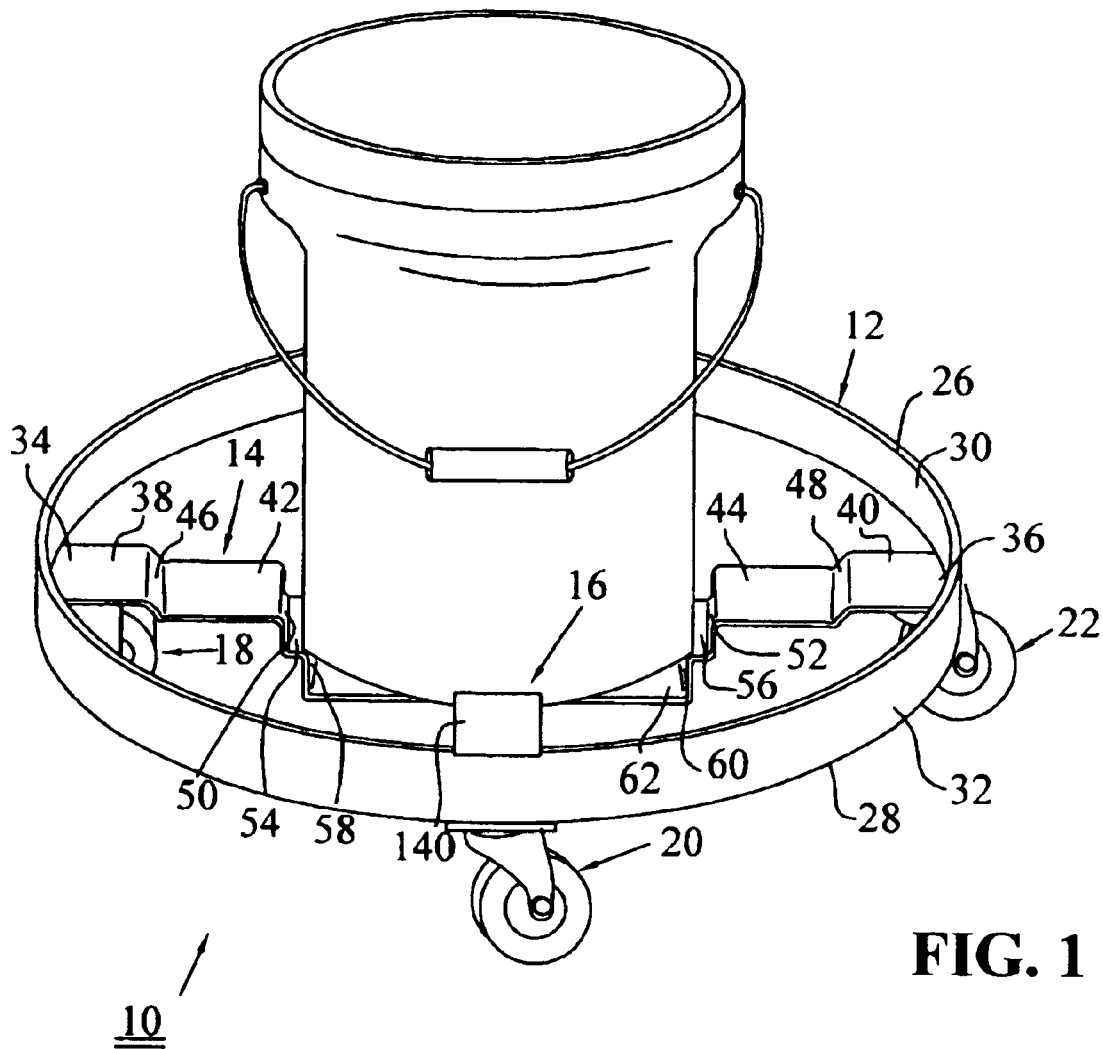
FIG. 1 is perspective view of a dolly according to the present invention supporting a 5-gallon bucket.

The embodiments of the invention described herein are not intended to be exhaustive or to limit the invention to the precise forms disclosed. Rather, the embodiments selected for description have been chosen to enable one skilled in the art to practice the invention.

Referring now to the drawings, a dolly, generally referred to by the numeral 10, includes an outer ring 12, a first support member 14, a second support member 16, and wheels or caster assemblies 18, 20, 22, 24 (three shown). Outer ring 12 includes an upper edge 26, a lower edge 28, an inner surface 30, and an outer surface 32. First support member 14 may be formed of a substantially flat strip of steel or other suitable material with curved ends 34, 36, each having a radius substantially corresponding to the radius of outer ring 12. Ends 34, 36 of support member 14 are welded or otherwise attached to outer ring 12 adjacent lower edge 28 of outer ring 12. Support member 14 includes outer support surfaces 38, 40 which lie in substantially the same plane adjacent ends 34, 36, respectively. Support member 14 also includes intermediate support surfaces 42, 44 which lie in substantially the same plane below the plane containing outer support surfaces 38, 40, and are connected to outer support surfaces 38, 40 by angled walls 46, 48, respectively. The other ends of intermediate support surfaces 42, 44 are connected to walls 50, 52, respectively. Walls 50, 52 extend downwardly in substantially perpendicular relationship to intermediate support surfaces 42, 44, respectively. A second pair of intermediate support surfaces 54, 56 lie in substantially the same plane, below the plane containing intermediate support surfaces 42, 44, and extend in substantially parallel relationship to intermediate support surfaces 42, 44, toward the center of outer ring 12. Second intermediate support surfaces 54, 56 are connected to downwardly projecting walls 58, 60, respectively. Walls 58, 60 are substantially perpendicular to second intermediate support surfaces 54, 56, and substantially parallel to walls 50, 52. A lower support surface 62 extends between walls 58, 60.

Figure 2:
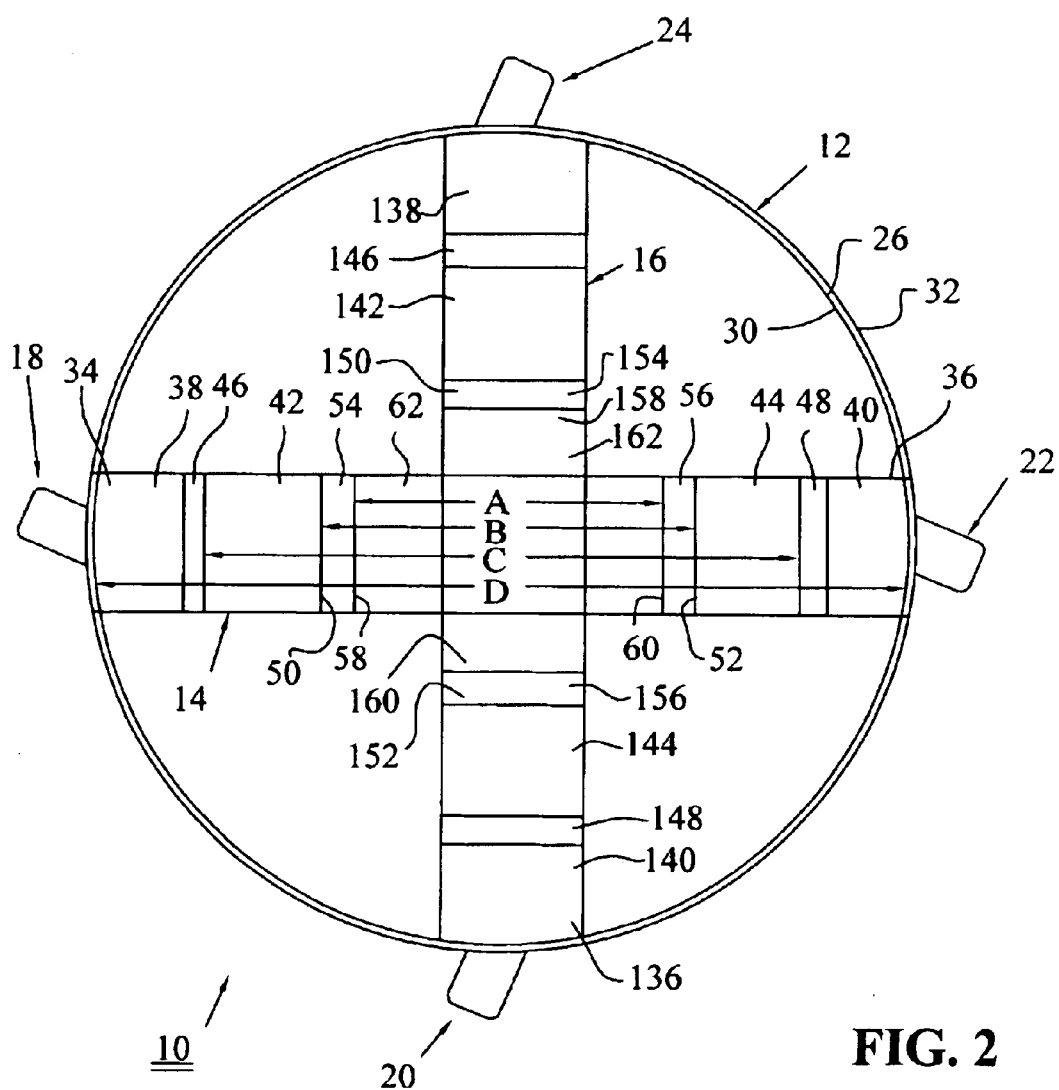
FIG. 2 is a top, plan view of the dolly shown in FIG. 1.

Support member 16 is substantially identical to support member 14. Accordingly, the corresponding components of support member 16 retain the reference designation used with respect to support member 14, but are increased by 100. As best shown in FIG. 2, support member 16 extends between outer ring 12 and through the center of outer ring 12 in substantially perpendicular relationship to support member 14. Support member 16 may be welded to or otherwise connected to support member 14 at the overlapping intersection between lower support surfaces 62, 162.

Figure 3:
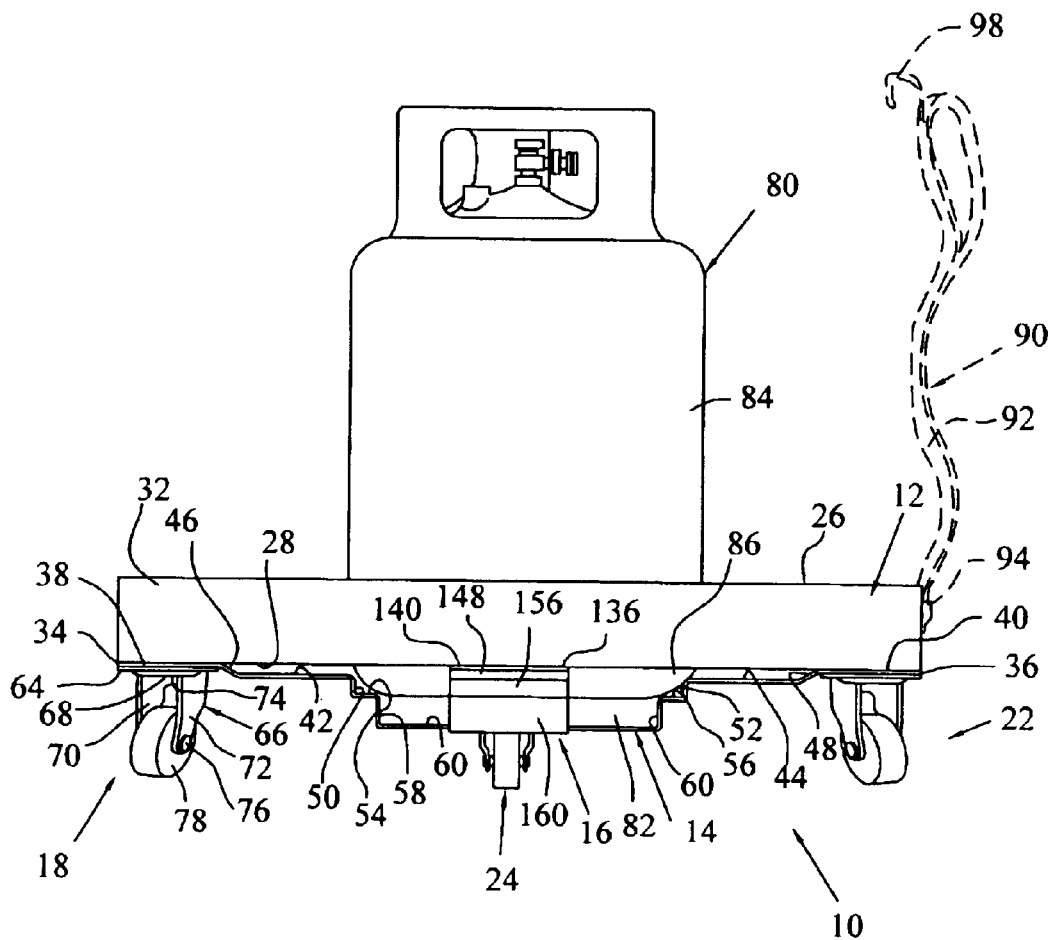
FIG. 3 is a side, elevational view of the dolly of FIG. 1 supporting a propane tank.

Casters 18, 20, 22, 24 are mounted below outer support surfaces 38, 140, 40, 138, respectively, and are identical in construction. Accordingly, only one caster is described below. As best shown in FIG. 3, caster 18 includes a mounting plate 64 which is connected by a swivel connection (not shown) to a wheel support 66 having an upper wall 68, and a pair of parallel side walls 70, 72 which are connected together by a rear wall 74. An axle 76 extends between side walls 70, 72 through a wheel 78.

Referring again to FIG. 2, outer ring 12 and support members 14, 16 define four nested container support locations, each having a different diameter. As shown, the largest diameter container (such as a 55-gallon drum) may be received within the support location (having a diameter D) defined by inner surface 30 of outer ring 12, and support surfaces 38, 140, 40, 138. A second size container (such as a 30-gallon drum) may be received within a second, nested support location (having a diameter C) defined by angled walls 46, 148, 48, 146, and intermediate support surfaces 42, 144, 44, 142. Similarly, a third, nested support location (having a diameter B) is defined by walls 50, 152, 52, 150, and second intermediate support surfaces 54, 156, 56, 154. This support location may be sized to receive a 5-gallon bucket as shown in FIG. 1. Finally, a fourth, nested support location (having a diameter A) is defined by walls 58, 160, 60, 158, and lower support surfaces 62, 162.

As best shown in FIG. 3, the smallest, fourth support location is sized to receive the cylindrical base 82 of a standard propane tank 80. The outer diameter of base 82 is slightly smaller than diameter A. Additionally, diameter B (between walls 50, 52 and walls 150, 152) provides additional protection against tipping of tank 80. As shown in the figure, the body 84 of tank 80 has a diameter which is larger than the diameter of base 82. The transition between these two diameters is gradual, forming a curved lower portion 86 between base 82 and body 84. As should be apparent from the figure, if tank 80 begins to tip in any direction, curved lower portion 86 of tank 80 will engage one of walls 50, 152, 52, 150, thereby preventing tank 80 from falling out of dolly 10.

In operation, a cylindrical container is placed within the appropriate support location provided by dolly 10. The container may then be moved along the floor in any direction since casters 18, 20, 22, 24 swivel 360° relative to outer ring 12 and rotate about their respective axles 76. Finally, the cylindrical container is simply lifted off of dolly 10 and positioned in the destination location.

In an alternative embodiment of the invention, dolly 10 may further include a strap 90 (shown in dotted lines in FIG. 3) for moving dolly 10 and any container placed thereon. Strap 90 may be formed of nylon or other suitable material, and includes a body 92 attached to outer ring 12 using any conventional fastener 94. The free end of strap body 92 includes a loop 96 which may function as a handle as described below. A hook 98 is attached to loop 96 using any conventional fastener. After placing a container on dolly 10, a worker can move the container and dolly 10 by pulling strap 90. Loop 96 provides a convenient handle for gripping strap 90. If the container is moved to a temporary storage location, hook 98 may be placed over an upper, peripheral lip of the container to retain strap 90 in an easily accessible location (as opposed to on the floor) for future moving of the container.

In addition to enabling workers to more easily move heavily cylindrical containers from one location to another, the dolly according to the present invention with its multiple, nested support locations reduces the number of dollies needed in a particular facility by essentially functioning as four dollies in one. Moreover, the dolly according to the present invention provides enhanced safety features by including the redundant, anti-tipping feature for propane tanks as described above.

Although the present invention has been shown and described in detail, the same is to be taken by way of example only and not by way of limitation. Numerous changes can be made to the embodiments described above without departing from the scope of the invention.

What is claimed is:

1. A multi-diameter container dolly comprising:

an outer ring;

a support member, comprised of two support elements, with each of said support elements spanning a different diameter of said outer ring, said support member having a plurality of support surfaces between first and second opposite ends spanning said outer ring, said support member defining an outer support surface at each said first and second ends adjacent said outer ring, said outer support surfaces being disposed in a substantially common first plane and said support member further defines a pair of first intermediate support surfaces radially inward of said outer support surfaces, and an angled first wall interconnecting each said first intermediate support surface and a corresponding one of said outer support surfaces so that said first intermediate surfaces are disposed in a substantially common second plane lower than said first plane; and a plurality of casters, one said caster attached to each said first and second ends of said support members adjacent said outer ring for rollingly supporting the dolly.

2. The dolly of claim 1 wherein said support members are substantially perpendicular to each other.

3. The dolly of claim 1, wherein each said support member further defines a pair of second intermediate support surfaces radially inward of said first intermediate support surfaces and a downwardly extending second wall interconnecting each said second intermediate support surface and a corresponding one of said first intermediate support surfaces so that said second intermediate support surfaces are disposed in a substantially common third plane lower than said second plane.

4. The dolly of claim 1 wherein said dolly further includes a tow strap having a first end attached to said outer ring and a free second end for moving the dolly.

5. The dolly of claim 3 wherein each said support member further defines a lower support surface between said second intermediate support surfaces and a pair of downwardly extending third walls interconnecting said second lower support surface and corresponding ones of said second intermediate support surfaces so that said lower support surface is disposed in a fourth plane lower than said third plane.

6. The dolly of claim 4 wherein said tow strap includes a hook member proximate said free end for securing said free end of said strap.

7. A multi-diameter container dolly comprising:

a support assembly, comprised of two support elements, with each of said support elements spanning a different diameter of an outer ring, said support assembly having a plurality of concentrically disposed support recesses, defined by a plurality of stepped surfaces in said support member;

said outer ring circumscribing a last of said plurality of stepped surfaces, and a plurality of casters attached to a lower side of said support assembly adjacent said outer ring for rollingly supporting the dolly.

8. The dolly of claim 7, wherein said support members are substantially perpendicular to each other.

9. The dolly of claim 7, wherein said support assembly defines an outer support surface at each said first and second ends adjacent said outer ring, said outer support surfaces being disposed in a substantially common first plane.

10. The dolly of claim 7, wherein said dolly further includes a tow strap having a first end attached to said outer ring and a free second end for moving the dolly.

11. The dolly of claim 9, wherein said support assembly further defines a pair of first intermediate support surfaces radially inward of said outer support surfaces, and an angled first wall interconnecting each said first intermediate support surface and a corresponding one of said outer support surfaces so that said first intermediate surfaces are disposed in a substantially common second plane lower than said first plane.

12. The dolly of claim 10, wherein said tow strap includes a hook member proximate said free end for securing said free end of said strap.

13. The dolly of claim 11, wherein each said support member further defines a pair of second intermediate support surfaces radially inward of said first intermediate support surfaces and a downwardly extending second wall interconnecting each said second intermediate support surface and a corresponding one of said first intermediate support surfaces so that said second intermediate support surfaces are disposed in a substantially common third plane lower than said second plane.

14. The dolly of claim 13, wherein each said support member further defines a lower support surface between said second intermediate support surfaces and a pair of downwardly extending third walls interconnecting said second lower support surface and corresponding ones of said second intermediate support surfaces so that said lower support surface is disposed in a fourth plane lower than said third plane.

* * * * *